United States Patent
Cundill

[19]

[11] Patent Number: 5,992,875
[45] Date of Patent: Nov. 30, 1999

[54] AIRBAG ASSEMBLY

[75] Inventor: David James Cundill, Leicester, United Kingdom

[73] Assignee: Breed Automotive Technology, Inc., Lakeland, Fla.

[21] Appl. No.: 08/939,562

[22] Filed: Sep. 29, 1997

[30]     Foreign Application Priority Data

Oct. 1, 1996 [GB] United Kingdom ................... 9620410

[51] Int. Cl.⁶ .................................................. B60R 21/20
[52] U.S. Cl. ..................................... 280/728.2; 280/728.3
[58] Field of Search ........................... 280/728.2, 728.3, 280/731, 732

[56]            References Cited

U.S. PATENT DOCUMENTS

| 4,770,439 | 9/1988 | Maier et al. | 280/728.2 |
| 5,297,813 | 3/1994 | Baba et al. | 280/728.3 |
| 5,354,093 | 10/1994 | Schenck et al. | 280/728.3 |
| 5,427,407 | 6/1995 | Yokote | 280/728.2 |
| 5,433,471 | 7/1995 | Shepherd et al. | 280/728.2 |
| 5,496,057 | 3/1996 | Niederman | 280/728.2 |
| 5,562,301 | 10/1996 | Lutz | 280/728.2 |
| 5,692,771 | 12/1997 | Milne, III et al. | 280/728.2 |

FOREIGN PATENT DOCUMENTS

| 686529 | 12/1995 | European Pat. Off. . |
| 728627 | 8/1996 | European Pat. Off. . |
| 4313616 | 10/1994 | Germany . |
| 2270882 | 3/1994 | United Kingdom . |
| 2273471 | 6/1994 | United Kingdom . |

*Primary Examiner*—Peter C. English
*Attorney, Agent, or Firm*—L. Drayer; B. Vrioni

[57]            ABSTRACT

An airbag assembly comprises a mounting member for attachment to part of the vehicle, an airbag secured to the mounting member and a cover for the airbag. The cover is connected to the mounting member at least partly by snap fit fastening. In another aspect, the cover is attached to the member by connecting a bent over flange on the cover to the mounting member. The method of assembly comprises assembling the cover, airbag and mounting member together into an airbag mounting sub-assembly and then attaching an airbag inflator to the sub-assembly.

7 Claims, 4 Drawing Sheets

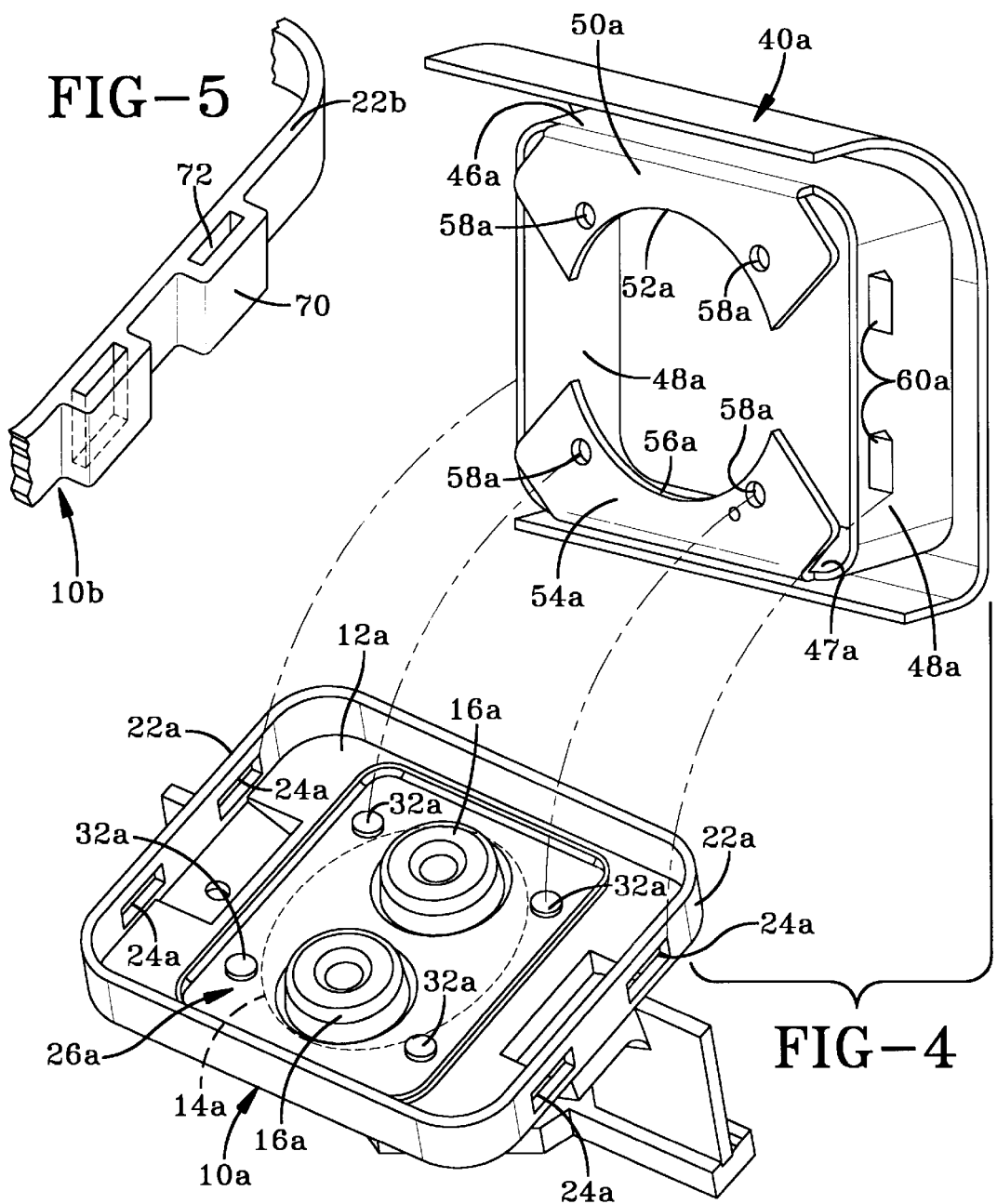

5,992,875

AIRBAG ASSEMBLY

BACKGROUND OF THE INVENTION

The invention relates to an airbag assembly for use in a vehicle.

A typical airbag assembly for use in the vehicle comprises a mounting member for attachment to a component of the vehicle, such as a steering wheel, an airbag secured to the mounting member and a cover connected to the mounting members by fasteners.

BRIEF SUMMARY OF THE INVENTION

An object of the present invention is to provide an improved airbag assembly which is designed to minimize the number of fasteners required to hold the cover in place.

According to one aspect of the invention there is provided an airbag assembly for use in a vehicle comprising a mounting member for attachment to part of the vehicle, an airbag secured to the mounting member and a cover for the airbag connected to the mounting member at least partly by snap fit fastening means.

The cover may also be connected to the mounting member by further fastening means such as screws, studs or rivets. In a preferred embodiment, the further fastening means connects a bent over flange on the cover to the mounting member.

According to a further aspect of the invention there is provided an airbag assembly for use in a vehicle comprising a mounting member for attachment to part of the vehicle, an airbag secured to the mounting member and a cover for the airbag connected to the mounting member by fastening means, the fastening means connecting a bent over flange on the cover to the mounting means.

For convenience of assembly, the flange may be bent over after assembling the airbag into the cover.

The aforesaid snap fit fastening means may comprise a first part on a wall of the cover and a second part on a wall of the mounting member. In such a case, the first part may comprise a projection on the wall of the cover which snap fits into an aperture in the wall of the mounting member.

The cover may have a plurality of walls one of which connects to the mounting member by said snap fit fastening means and the other of which has thereon the bent over flange.

Preferably, the airbag is carried by a retainer and the aforesaid bent over flange is preferably sandwiched between the retainer and the mounting member. The retainer may have thereon said fastening means or the aforesaid further fastening means which connects the bent over flange to the mounting member.

The mounting member preferably carries an inflator for the airbag.

According to another aspect of the invention, there is provided a method of assembling an airbag for use in a vehicle comprising the steps of providing a mounting member for attachment to part of the vehicle, an airbag, a cover for the airbag and an inflator for the airbag, securing the airbag to the mounting member and connecting the cover to the mounting member so as to form an airbag mounting sub-assembly and attaching the inflator to the airbag mounting sub-assembly.

In that way, the airbag can be assembled in the mounting and handled separately from the airbag inflator which contains explosive and thus must be stored and handled under strict safety conditions. Advantageously, the airbag mounting sub-assembly can then be tested before attaching the potentially hazardous inflator.

BRIEF DESCRIPTION OF THE DRAWINGS

An airbag assembly in accordance with the invention will now be described by way of example with reference to the accompanying drawings in which:

FIG. 4 is an exploded perspective view showing part of a further airbag assembly for use on the driver's side of a vehicle and FIG. 5 is a diagrammatic perspective view showing an alternative form slotted sidewall on a mounting member to facilitate the snap fit fastening of the cover.

DETAILED DESCRIPTION OF THE PREFERRED EMBODIMENTS

Figure 1:
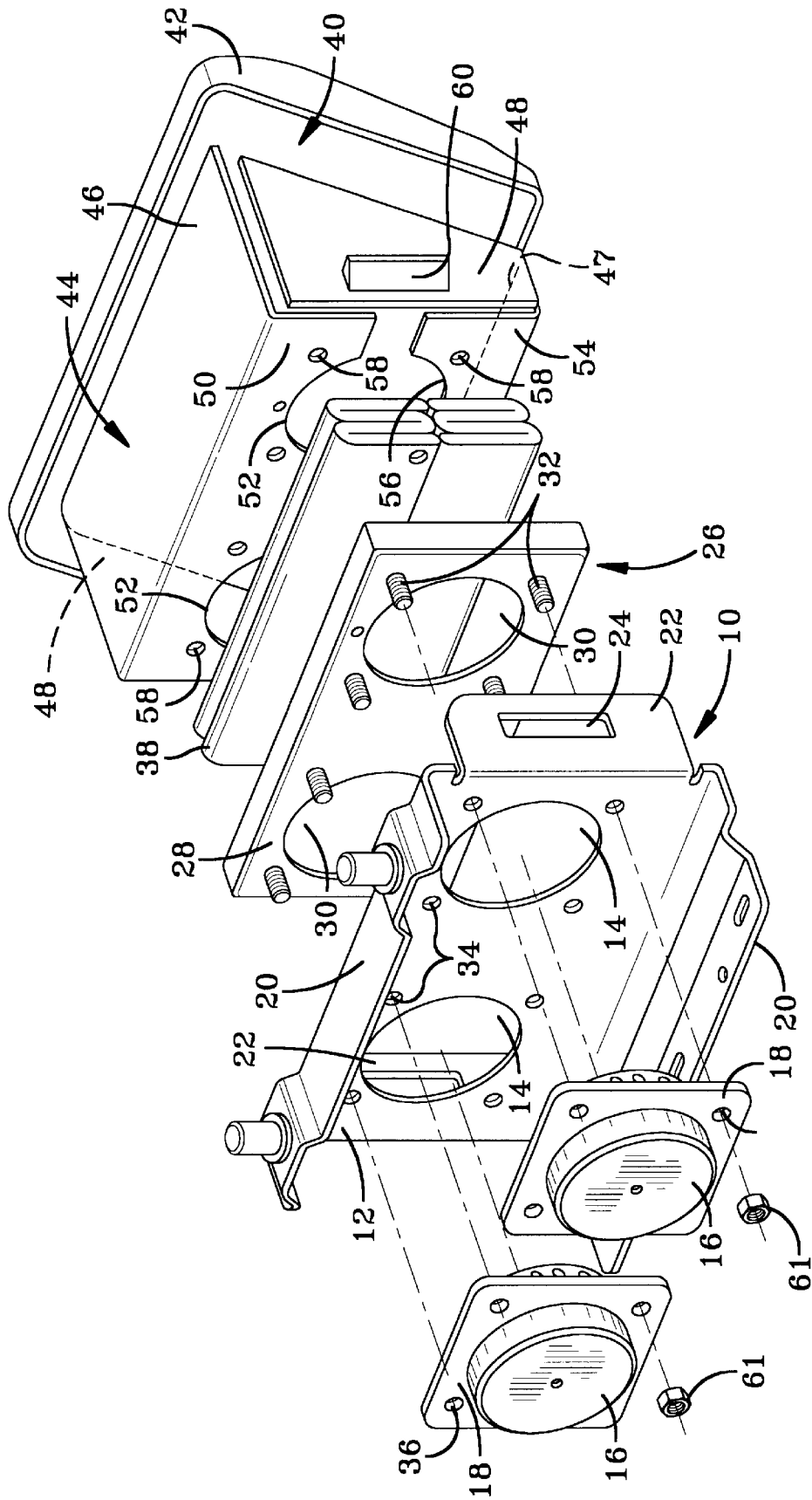
FIG. 1 is an exploded perspective view of one form of airbag assembly in accordance with the invention for use on a front passenger side of a vehicle.

Looking at FIG. 1, a mounting member 10 is in the form of a tray having a base 12 formed with spaced apart apertures 14 for receiving two inflators 16 in the form of pyrotechnic gas generators. The inflators 16 have fixing flanges 18 by means of which the inflators are held in position on the mounting member 10 as described below. The mounting member 10 has upper and lower walls 20 as viewed in the drawing and opposed sidewalls 22. The two sidewalls 22 are formed with rectangular slots 24 one only of which is visible in FIG. 1.

A retainer 26 is substantially tray-like and has a base 28 formed with apertures 30 substantially identical to the apertures 14 for alignment therewith. The retainer 26 carries two sets of four screw-threaded fasteners 32 each set of four fasteners being equi-spaced around the associated aperture 30. The fasteners 32 align with apertures 34 in the mounting member base 12 and with apertures 36 in the inflator flanges 18. The retainer 26 has suitably mounted thereon a folded airbag 38 of a kind known in the art. Conveniently, the retainer 26 may be mounted over part of the airbag 38 to hold the airbag in position.

A cover 40 for the airbag 38 includes a cover section 42 having a securing wall arrangement 44 extending therefrom. The wall arrangement comprises upper and lower walls 46, 47 and two identical side walls 48. The upper wall 46 is formed with a downwardly projecting flange 50 formed with two arcuate cut-outs 52 which can be aligned with the apertures 14 in the mounting member 10. The lower wall 47 is formed with a similar flange 54 which likewise is formed with two arcuate cut-outs indicated at 56 which can also align with the apertures 14 of the mounting member 10. The arcuate cut-outs 52, 56 are associated with sets of apertures 58 which can be aligned with the apertures 34 of the mounting member base 12.

Figure 2:
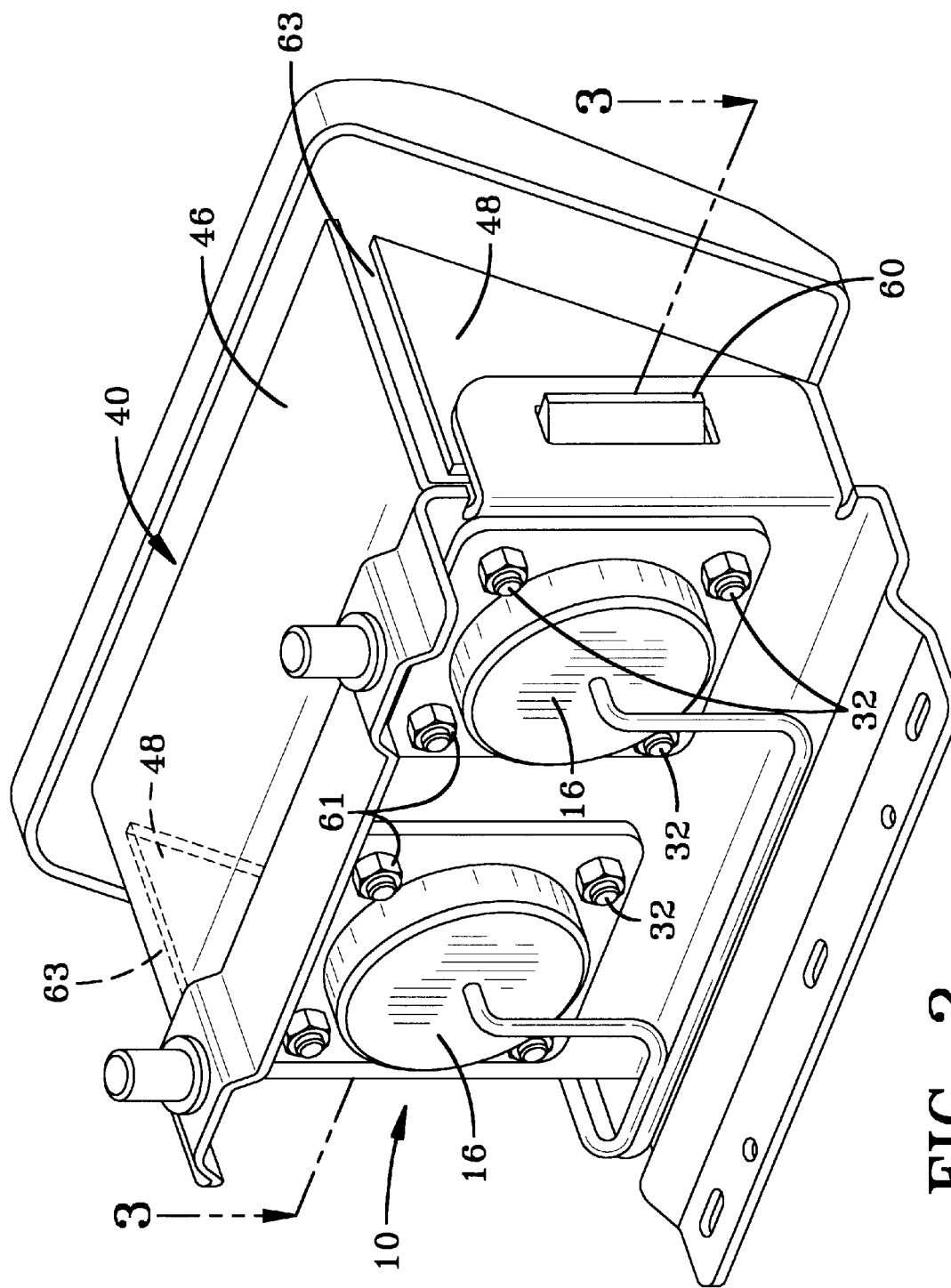
FIG. 2 is a perspective view of the assembly of FIG. 1 in a fully assembled condition.
Figure 3:
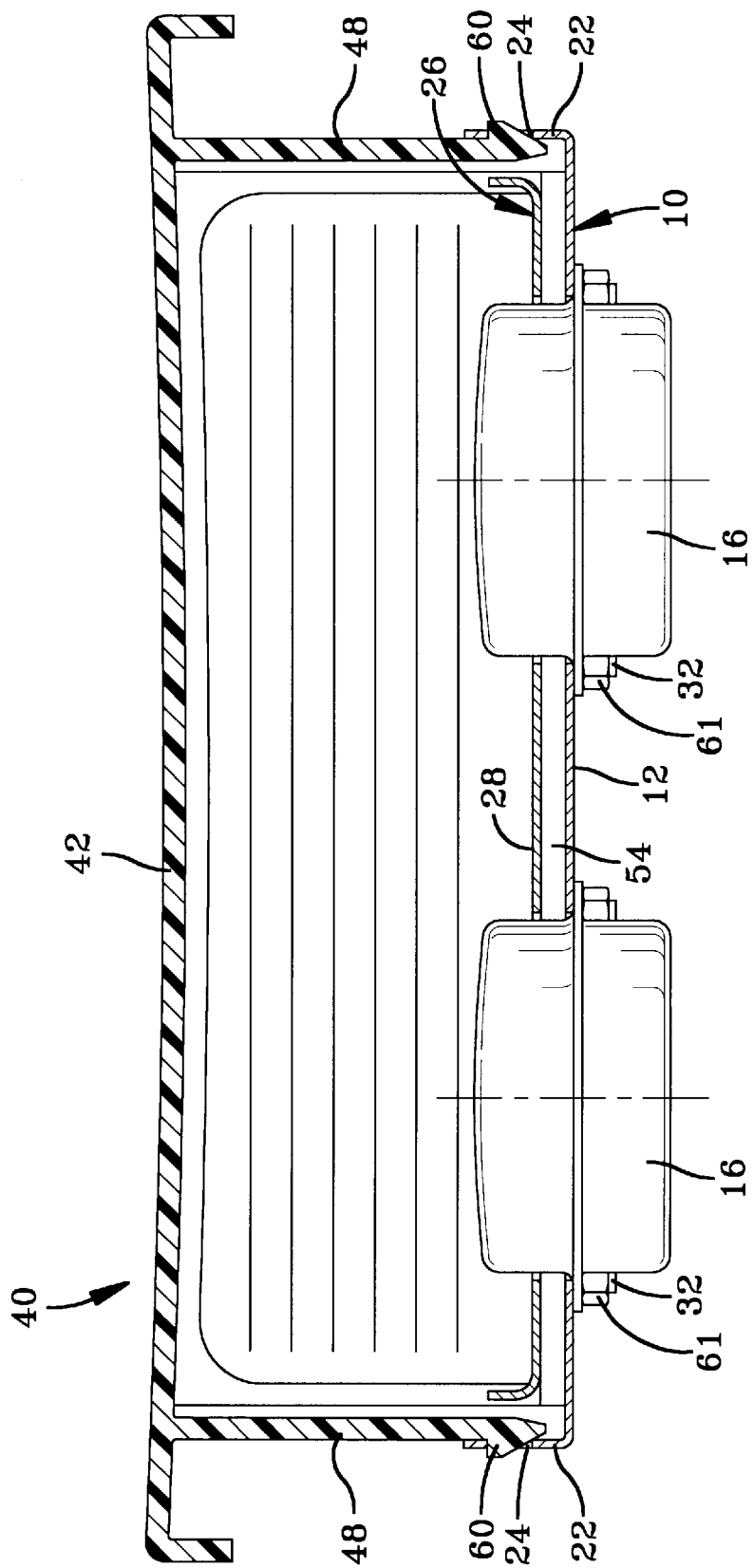
FIG. 3 is a diagrammatic cross-sectional view of the airbag assembly shown in FIG. 2 generally on the line 3—3 in FIG. 2.

To assemble the components shown in FIG. 1, the flanges 50, 54 initially lie in the same plane as the upper and lower walls 46, 47 of the cover 40. The retainer 26 with its airbag 38 is then assembled into the cover 40 so that the airbag 38 lies adjacent the cover section 42. The flanges 50, 54 are then bent over into the positions shown in FIG. 1 and the fasteners 32 on the retainer 26 are passed forwardly through the apertures 58 in the flanges 50, 54. The side walls 48 are formed with two ramp-like projections 60. The cover 40 with the retainer and airbag therein as a sub-assembly are then assembled into the mounting member 10 so that the fasteners 32 project through the apertures 34 in the mounting member base 12 with the flanges 50, 54 of the cover 40 sandwiched between the base 28 of the retainer 26 and the base 12 of the mounting member 10. The mounting member 10 has its walls 20, 22 so spaced that the walls 46, 47 and 48 of the cover can be received within the mounting member 10. As the fasteners 32 of the retainer 26 are passed through the apertures 34, the ramp-like projections 60 cause the walls 48 to be urged inwardly by the walls 22 of the mounting member 10 until the projections 60 align with and snap through the slots 24 in the walls 22. The inflators 16 are then placed in position with the fasteners 32 passing through the apertures 36 in the flanges 18. Suitable nuts 61 can then be applied to the fasteners 32 to hold the assembled parts together. The use of the snap-fit projections 60 provides additional mounting security of the cover 40 without the need to provide further screw-threaded fasteners. Moreover, by sandwiching the bent over flanges 50, 54 between the mounting member 10 and the retainer 26, the cover 40 is held in a very secure manner. The assembled components can be seen in FIG. 2 (except that in FIG. 2 the walls 46, 47 are separated from side walls 48 by slots 63) and can also be seen in cross-section in FIG. 3. The assembled components as shown in FIG. 2 can then be suitably secured within the dashboard of a vehicle on the passenger side thereof.

The method has the advantage that the snap fitting arrangement holds the cover 40, airbag 38 and mounting member 10 together as a single unit or airbag mounting sub-assembly. The sub-assembly can then be manipulated through any additional testing or manufacture steps as one object before the inflators 16 are attached. The inflators can be attached last to the assembly which is advantageous since the inflators often contain explosive substances and require sensitive handling which may not be possible during manufacture of the remainder of the assembly.

In use, operation of the inflators 16 causes the airbag 38 to inflate and the cover section 42 to release in known manner from the remainder of the cover 40 which is held firmly in place by the bent over flanges 50, 54, the fasteners 32 and the snap-fit projections 60 which have a ramp on one side only to provide a non-return.

In FIG. 4, parts corresponding to parts shown in FIG. 1 carry the same reference numerals followed by the letter "a".

In FIG. 4, the mounting member 10a has opposed walls 22a formed with spaced apart slots 24a which receive respective snap-fit projections 60a on side walls 48a of a cover 40a. Upper and lower walls 46a, 47a include flanges 50a, 54a which are formed with respective arcuate cut-outs 52a, 56a. The flanges are also formed with apertures 58a.

A retainer 26a for an airbag (not shown) carries four fasteners 32a which can align with the apertures 58a and corresponding apertures (not shown) in the base 12a of the mounting member 10a. As in FIG. 1, the retainer 26a together with its airbag is assembled into the cover 40a and the flanges 50a, 54a are then bent into the position shown in FIG. 4 with the fasteners 32a projecting through the apertures 58a. The cover 40a and the retainer 26a and airbag as a sub-assembly are then assembled into the support member 10a so that the fasteners 32a project through the corresponding apertures in the base 12a and the projections 60a on the cover 40a snap-fit into the slots 24a of the mounting member 10a. Either a single inflator (not shown) can pass through an aperture 14a in the base 12a to be received between the arcuate cut-outs 52a, 56a or two separate inflators indicated at 16a may be used which will clear the inner edges of the arcuate cut-outs 52a, 56a when the flanges 50a, 54a are sandwiched between the retainer 26a and the base 12a of the support member 10a.

As shown in FIG. 5, instead of the side wall 22b of the mounting member being formed with simple slots, the side walls 22b may be formed with protrusions 70 formed with slots 72 which are formed internally to provide a snap-fit with corresponding elongate tongues on a wall of the cover. The tongues would pass through the slots 72 and snap past a lower edge thereof to retain the cover on the support member 10b.

Any convenient number of slots may be provided in the side walls 22b to the secure the cover.

I claim:

1. An airbag assembly for use in a vehicle comprising a mounting member for attachment to part of the vehicle;

an airbag secured to the mounting member; and a cover for the airbag;

the cover being connected to the mounting member at least partly by snap fit fastening means and connected to the mounting member by a further fastening means, wherein the cover has a flange which extends from a part of the cover adjacent the mounting member and which can be bent over onto the mounting member, said further fastening means connecting the bent over flange to the mounting member.

2. An airbag assembly according to claim 1 in which the cover has a plurality of walls, one of which connects to the mounting member by said snap fit fastening means and another of which has thereon the bent over flange.

3. An airbag assembly according to claim 1 in which the airbag is carried by a retainer and the aforesaid bent over flange is sandwiched between the retainer and the mounting member.

4. An airbag assembly according to claim 3 in which the retainer has thereon the aforesaid further fastening means which connects the bent over flange to the mounting member.

5. An airbag assembly according to claim 1 in which the snap fit fastening means comprises a first part on a wall of the cover and a second part on a wall of the mounting member.

6. An airbag assembly according to claim 5 in which the first part comprises a projection on the wall of the cover which snap fits into a slot in the wall of the mounting member.

7. An airbag assembly according to claim 1 in which the mounting member carries an inflator for the airbag.

* * * * *